United States Patent
Ikawa et al.

(10) Patent No.: US 9,534,851 B2
(45) Date of Patent: Jan. 3, 2017

(54) METHOD FOR ANTICORROSION TREATMENT OF OUTER SURFACE OF HEAT EXCHANGE TUBE MADE OF ALUMINUM EXTRUSION AND METHOD FOR PRODUCING HEAT EXCHANGER

(71) Applicant: KEIHIN THERMAL TECHNOLOGY CORPORATION, Oyama-shi (JP)

(72) Inventors: Youhei Ikawa, Oyama (JP); Takashi Terada, Oyama (JP); Hiroshi Otsuki, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 88 days.

(21) Appl. No.: 14/294,064

(22) Filed: Jun. 2, 2014

(65) Prior Publication Data
US 2014/0360017 A1    Dec. 11, 2014

(30) Foreign Application Priority Data
Jun. 7, 2013    (JP) ................. 2013-120426

(51) Int. Cl.
*F28F 1/12*    (2006.01)
*B21D 53/08*    (2006.01)
(Continued)

(52) U.S. Cl.
CPC .............. *F28F 1/12* (2013.01); *B21D 53/085* (2013.01); *B23K 1/0012* (2013.01); *B23P 15/26* (2013.01);
(Continued)

(58) Field of Classification Search
CPC ............... B05D 1/02; B05D 1/12; B05D 1/28; B05D 5/00; B05D 7/146; B05D 2202/25; B05D 2254/02; B05D 2401/32; B21D 53/06–53/085; B23K 1/0012; B23K 2201/08; B23K 2201/14; B23K 2203/10; B23P 15/26; C23C 10/30; F28F 19/02; F28F 19/06; F28F 21/084; F28F 21/089; F28F 2001/428; F28F 2245/00; F28F 2275/045; Y10T 29/49378–29/49384; Y10T 29/49391; Y10T 29/49393
See application file for complete search history.

(56) References Cited

U.S. PATENT DOCUMENTS 7,722,922 B2 *    5/2010    Yamaguchi ........... B22F 1/0074
                                                                                  427/201
2010/0051247 A1 *    3/2010    Sogabe .................. B21D 53/08
                                                                                  165/151
(Continued)

FOREIGN PATENT DOCUMENTS

JP    11-216592    8/1999
JP    2006-2212    1/2006

OTHER PUBLICATIONS

"MatWeb—1050A Composition Spec", MatWeb, accessed Feb. 26, 2016, http://www.matweb.com/search/DataSheet.aspx?MatGUID=4c63adf7b8af464fa90cadd7c3e501f3&ckck=1.*

*Primary Examiner* — Christopher Besler
*Assistant Examiner* — Matthew P Travers
(74) *Attorney, Agent, or Firm* — Mori & Ward, LLP

(57) ABSTRACT

The anticorrosion treatment method of the invention is carried out on the outer surface of an aluminum extruded heat exchange tube which is formed of an Al alloy containing Mn 0.2 to 0.3 mass %, Cu 0.05 mass % or less, and Fe 0.2 mass % or less, and which has a wall thickness of 200 µm or less. The anticorrosion treatment method includes applying a specific dispersion of a flux powder and a Zn (Continued)

powder onto the outer surface of the heat exchange tube, and vaporizing a liquid component of the dispersion, to thereby deposit the Zn powder and the flux powder on the outer surface of the heat exchange tube, such that the Zn powder deposition amount, the flux powder deposition amount, and the ratio of the flux powder deposition amount to the Zn powder deposition amount are adjusted to specific values.

6 Claims, 3 Drawing Sheets

(51) Int. Cl.
| | |
|---|---|
| F28F 19/06 | (2006.01) |
| B23P 15/26 | (2006.01) |
| B23K 1/00 | (2006.01) |
| C23C 10/30 | (2006.01) |
| B05D 1/12 | (2006.01) |
| F28F 21/08 | (2006.01) |
| B05D 7/14 | (2006.01) |
| B05D 1/28 | (2006.01) |
| F28F 1/42 | (2006.01) |

(52) U.S. Cl.
CPC ............... *C23C 10/30* (2013.01); *F28F 19/06* (2013.01); *B05D 1/12* (2013.01); *B05D 1/28* (2013.01); *B05D 7/146* (2013.01); *B05D 2202/25* (2013.01); *B05D 2254/02* (2013.01); *B05D 2401/32* (2013.01); *F28F 21/084* (2013.01); *F28F 2001/428* (2013.01); *F28F 2275/045* (2013.01); *Y10T 29/49378* (2015.01); *Y10T 29/49393* (2015.01)

(56) References Cited

U.S. PATENT DOCUMENTS

| | | | |
|---|---|---|---|
| 2010/0116472 A1* | 5/2010 | Katsumata | ........... B23K 1/0012 165/133 |
| 2014/0033534 A1* | 2/2014 | Wintersteen | ............ F28F 19/06 29/890.047 |
| 2015/0239071 A1* | 8/2015 | Kiga | ..................... B23K 35/28 165/133 |

* cited by examiner

METHOD FOR ANTICORROSION TREATMENT OF OUTER SURFACE OF HEAT EXCHANGE TUBE MADE OF ALUMINUM EXTRUSION AND METHOD FOR PRODUCING HEAT EXCHANGER

BACKGROUND OF THE INVENTION

The present invention relates to a method for anticorrosion treatment of the outer surface of a heat exchange tube made of an aluminum extrusion (hereinafter may be referred to as an "aluminum extruded heat exchange tube," and to a method for producing a heat exchanger. More particularly, the present invention relates to a method for anticorrosion treatment of the outer surface of an aluminum extruded heat exchange tube for use in car air conditioner condensers, evaporators, and heater cores, and radiators which are installed in vehicles such as automobiles, and to a method for producing a heat exchanger having an aluminum extruded heat exchange tube whose outer surface has been subjected to anticorrosion treatment.

As used herein, the term "aluminum" refers to elemental aluminum as well as to aluminum alloys. Materials represented by an elemental symbol refer to pure materials of the corresponding element.

A typical condenser widely used in car air conditioners includes a pair of header tanks formed of aluminum, a plurality of flat heat exchange tubes formed of aluminum extrusion, corrugated fins formed of aluminum, and side plates formed of aluminum. The header tanks are disposed such that their longitudinal direction coincides with a vertical direction and they are spaced apart from each other. The heat exchange tubes are disposed between the two header tanks such that their width direction coincides with an air-passing direction, and they are spaced apart from each other in the vertical direction. Opposite end portions of the heat exchange tubes are brazed to the corresponding header tanks. Each of the fins is disposed between adjacent heat exchange tubes, on the upper side of the upper-end heat exchange tube, or on the lower side of the lower-end heat exchange tube. The fins are brazed to the corresponding heat exchange tubes. The side plates are disposed on the upper side of the upper-end fin and on the lower side of the lower-end fin, and are brazed to these fins. Such a condenser is produced by simultaneously bonding header tanks (including a member for forming the header tanks), heat exchange tubes, and fins, through brazing.

Meanwhile, since condensers for car air conditioners are used under corrosive circumstances, pit corrosion of walls of heat exchange tubes, which would otherwise occur within a relatively short period, must be prevented, so as to prevent leakage of a refrigerant from the heat exchange tubes.

Conventionally, there has been proposed a heat exchanger production method for preventing occurrence, within a relatively short period, of pit corrosion of walls of heat exchange tubes of a condenser for car air conditioners. The production method includes providing aluminum extruded heat exchange tubes each being formed of an alloy comprising Mn 0.15 mass % and Cu 0.4 mass %, the balance being Al, and unavoidable impurities, and corrugated fins formed from a brazing sheet composed of an aluminum core which is made of Mn 1.2 mass %, Cu 0.15 mass %, and Zn 2.5 mass %, the balance being Al, and unavoidable impurities, and a cladding which is made of an aluminum braze of AA4343 and covers both surfaces of the core; applying a dispersion of a flux powder and a Zn powder in a binder onto the outer surface of the heat exchange tube, and vaporizing a liquid component of the dispersion, to thereby deposit the Zn powder and the flux powder on the outer surface of the heat exchange tube, such that the Zn powder deposition amount is adjusted to 2 to 4 g/m$^2$, the flux powder deposition amount is adjusted to 15 g/m$^2$ or less, and the ratio of the flux powder deposition amount to the Zn powder deposition amount (flux powder deposition amount/Zn powder deposition amount) is adjusted to 1 or less; and combining and heating the heat exchange tubes and the fins, to thereby braze the heat exchange tubes to the fins by use of the flux powder deposited on the outer surface of each heat exchange tube and the cladding of each fin, and melting the Zn powder deposited on the outer surface of each heat exchange tube, and then diffusing Zn to an outer surface portion of the heat exchange tube, to thereby form a Zn diffusion layer in the outer surface portion of the heat exchange tube (see Japanese Patent Application Laid-Open (kokai) No. Hei 11-216592).

In the method disclosed in the patent publication, pit corrosion, which would otherwise occur within a relatively short period in walls of heat exchange tubes, is prevented through sacrificial corrosion of the Zn diffusion layer. However, the ratio of the thickness of the Zn diffusion layer to the wall thickness of each heat exchange tube increases excessively, due to the composition of the alloy forming the heat exchange tubes, a ratio of the amount of flux powder deposited on the outer surface of each heat exchange tube to the amount of Zn powder deposited on the outer surface (flux powder deposition amount/Zn powder deposition amount) being 1 or less, a large particle size of Zn powder (not described in detail), and other factors. Thus, when the wall thickness of the heat exchange tube is small; e.g., 200 μm or less, through holes may be formed in walls of the heat exchange tubes within a relatively short period of time.

Japanese Patent Application Laid-Open (kokai) No. Hei 11-216592 does not specifically disclose the wall thickness of the employed aluminum extruded heat exchange tube. However, Japanese Patent Application Laid-Open (kokai) No. 2006-2212 (paragraph 0039) discloses the wall thickness of the extruded heat exchange tube having the outer surface onto which a Zn-containing flux is applied. The extruded heat exchange tube, which is used in a manner similar to that of the heat exchange tube disclosed in Japanese Patent Application Laid-Open (kokai) No. HEI 11-216592, has a wall thickness of about 400 μm.

SUMMARY OF THE INVENTION

An object of the present invention, for solving the aforementioned problem, is to provide a method for treating the outer surface of an aluminum extruded heat exchange tube, which method can enhance pit corrosion resistance. Another object is to provide a method for producing a heat exchanger.

The present invention, for attaining the above objects, is directed to the following modes.

1) A method for performing an anticorrosion treatment on an outer surface of an aluminum extruded heat exchange tube, the method comprising providing an aluminum extruded heat exchange tube which is formed of an alloy comprising Mn 0.2 to 0.3 mass %, Cu 0.05 mass % or less, and Fe 0.2 mass % or less, the balance being Al, and unavoidable impurities, and which has a wall thickness of 200 μm or less;

applying a dispersion of a flux powder and a Zn powder having a mean particle size of 3 to 5 μm and a maximum particle size less than 10 μm in a binder onto the outer surface of the heat exchange tube, and vaporizing a liquid component of the dispersion, to thereby deposit the Zn powder and the flux powder on the outer surface of the heat exchange tube, such that an amount of the deposited Zn powder (hereinafter may be referred to as a "Zn powder deposition amount") is adjusted to 1 to 3 g/m$^2$, an amount of the deposited flux powder (hereinafter may be referred to as a "flux powder deposition amount") is adjusted to 15 g/m$^2$ or less, and a ratio of the flux powder deposition amount to the Zn powder deposition amount (flux powder deposition amount/Zn powder deposition amount) is adjusted to 1 or more; and elevating the temperature of the heat exchange tube to thereby melt the Zn powder, and then diffusing Zn to an outer surface portion of the heat exchange tube, to thereby form a Zn diffusion layer in the outer surface portion of the heat exchange tube.

In the anticorrosion treatment method as described 1) above, the alloy forming the aluminum extruded heat exchange tube may have a Cu content or an Fe content of 0%.

In the anticorrosion treatment method as described 1) above, Mn contained in the alloy forming the aluminum extruded heat exchange tube enhances the strength of the heat exchange tube. When the Mn content is less than 0.2 mass %, the effect fails to be attained, whereas when the Mn content is in excess of 0.3 mass %, extrudability decreases. Thus, the Mn content must be regulated to 0.2 to 0.3 mass %. Cu contained in the alloy is an unavoidable impurity. When the Cu content is excessively high, the tube wall of the heat exchange tube is corroded at excessively high speed. In the case where the wall thickness is 200 µm or less, corrosion resistance is poor. Thus, the Cu content must be regulated to 0.05 mass % or less. In the anticorrosion treatment method as described 1) above, the Cu content of the alloy forming the aluminum extruded heat exchange tube is preferably 0. Fe contained in the alloy is an unavoidable impurity. When the Fe content is excessively high, the tube wall of the heat exchange tube is corroded at excessively high speed. In the case where the wall thickness is 200 µm or less, corrosion resistance is poor. Thus, the Fe content must be regulated to 0.2 mass % or less.

The reason for regulating the mean particle size of Zn powder to 3 to 5 µm and the maximum particle size to less than 10 µm is as follows. When the mean particle size is excessively small, difficulty is encountered in production of the Zn powder, and the surface area of the Zn particles increases, resulting in formation of a large amount of surface oxide film. In this case, a large amount of flux is required for removing the surface oxide film. When the maximum particle size is excessively large, erosion may occur, and the Zn concentration of the melt formed from the Zn powder in a subsequent heating step becomes locally non-uniform.

The reason for regulating the Zn powder deposition amount on the outer surface of the heat exchange tube to 1 to 3 g/m$^2$ is as follows. When the deposition amount is less than 1 g/m$^2$, the Zn diffusion layer to be formed in the outer surface portion of the heat exchange tube by a subsequent heating step is insufficient, whereby the consistency of attaining sufficient sacrificial anticorrosion effect decreases. When the deposition amount is in excess of 3 g/m$^2$, the ratio of the thickness of the Zn diffusion layer to be formed in outer surface portion to the wall thickness of the heat exchange tube increases excessively, whereby the tube wall thickness after corrosion becomes thin, resulting in a drop in strength of the tube.

The reason for regulating the flux powder deposition amount on the outer surface of the heat exchange tube to 15 g/m$^2$ or less is as follows. When the deposition amount is in excess of 15 g/m$^2$, Zn powder flows out in the case where the flux is melted in a subsequent heating step. Notably, the lower limit of the flux powder deposition amount is determined to be such an amount that the flux powder sufficiently degrades the oxide film formed on the outer surface of the heat exchange tube and that formed on the particles of the Zn powder.

Furthermore, the reason for regulating the ratio of the flux powder deposition amount to the Zn powder deposition amount (flux powder deposition amount/Zn powder deposition amount) to 1 or higher is as follows. When the ratio is lower than 1, complete degradation of oxide film formed on the particles of the Zn powder cannot be accomplished.

2) A method for anticorrosion treatment on an outer surface of an aluminum extruded heat exchange tube as described in 1) above, wherein the dispersion is applied onto the outer surface of the heat exchange tube through spraying and, subsequently, the liquid component of the dispersion is vaporized, to thereby deposit the Zn powder and the flux powder on the outer surface of the heat exchange tube.

3) A method for anticorrosion treatment on an outer surface of an aluminum extruded heat exchange tube as described in 1) above, wherein the dispersion is applied onto the outer surface of the heat exchange tube through roller coating after the outer surface has been heated in advance and, subsequently, the liquid component of the dispersion is vaporized, to thereby deposit the Zn powder and the flux powder on the outer surface of the heat exchange tube.

4) A method for producing a heat exchanger, comprising providing an aluminum extruded heat exchange tube which is formed of an alloy comprising Mn 0.2 to 0.3 mass %, Cu 0.05 mass % or less, and Fe 0.2 mass % or less, the balance being Al, and unavoidable impurities, and which has a wall thickness of 200 µm or less, and fins formed from a brazing sheet composed of an aluminum core and a cladding made of an aluminum braze and covering both surfaces of the core;

applying a dispersion of a flux powder and a Zn powder having a mean particle size of 3 to 5 µm and a maximum particle size less than 10 µm in a binder onto the outer surface of the heat exchange tube, and vaporizing a liquid component of the dispersion, to thereby deposit the Zn powder and the flux powder on the outer surface of the heat exchange tube, such that a Zn powder deposition amount is adjusted to 1 to 3 g/m$^2$, a flux powder deposition amount is adjusted to 15 g/m$^2$ or less, and a ratio of the flux powder deposition amount to the Zn powder deposition amount (flux powder deposition amount/Zn powder deposition amount) is adjusted to 1 or more; and combining and heating the heat exchange tube and the fins, to thereby braze the heat exchange tube to the fins by use of the flux powder deposited on the outer surface of the heat exchange tube and the braze of the fins, and melting the Zn powder deposited on the outer surface of the heat exchange tube, and then diffusing Zn to an outer surface portion of the heat exchange tube, to thereby form a Zn diffusion layer in the outer surface portion of the heat exchange tube.

In the heat exchanger production method as described in 4) above, respective parameters are limited for the same reasons as employed in the anticorrosion treatment method as described in 1) above.

5) A heat exchanger production method as described in 4) above, wherein the dispersion is applied onto the outer surface of the heat exchange tube through spraying and, subsequently, the liquid component of the dispersion is vaporized, to thereby deposit the Zn powder and the flux powder on the outer surface of the heat exchange tube.

6) A heat exchanger production method as described 4) above, wherein the dispersion is applied onto the outer surface of the heat exchange tube through roller coating after the outer surface has been heated in advance and, subsequently, the liquid component of the dispersion is vaporized, to thereby deposit the Zn powder and the flux powder on the outer surface of the heat exchange tube.

According to the anticorrosion treatment methods as described in 1) to 3) above, a Zn diffusion layer serving as a sacrificial anticorrosion layer is formed in the outer surface portion of aluminum extruded heat exchange tube through the following mechanism, whereby pit corrosion resistance of the heat exchange tube is enhanced.

Specifically, a dispersion of a flux powder and a Zn powder having a mean particle size of 3 to 5 μm and a maximum particle size less than 10 μm in a binder is applied onto the outer surface of the heat exchange tube, and a liquid component of the dispersion is vaporized, to thereby deposit the Zn powder and the flux powder on the outer surface of the heat exchange tube, such that the Zn powder deposition amount is adjusted to 1 to 3 $g/m^2$, the flux powder deposition amount is adjusted to 15 $g/m^2$ or less, and the ratio of the flux powder deposition amount to the Zn powder deposition amount (flux powder deposition amount/Zn powder deposition amount) is adjusted to 1 or more. As a result, a layer composed of the flux powder is formed on the outer surface of the heat exchange tube, and Zn is dispersed in a stable manner in the flux powder layer. Subsequently, when the temperature of the heat exchange tube is elevated, the Zn powder is melted. The molten Zn is also dispersed in the flux powder in a stable manner, similar to the state before melting. Then, when the temperature of the heat exchange tube is further elevated, the flux powder melts, and the molten flux and the molten Zn flow and spread, whereby Zn diffuses in the outer surface portion of the heat exchange tube. Thus, the Zn diffusion layer is formed. The thus-formed Zn diffusion layer has a generally uniform thickness, and the thickness is relatively small. In addition, the Cu content of the alloy forming the heat exchange tube is regulated to 0.05 mass % or less. Under these conditions, sacrificial corrosion of the Zn diffusion layer proceeds at relatively low speed. As a result, even in the case where the heat exchange tube has a wall thickness of 200 μm or less, pit corrosion is prevented, whereby pit corrosion resistance of the heat exchange tube is enhanced.

According to the anticorrosion treatment method as described in 3) above, the dispersion of the flux powder and the Zn powder in the binder is applied, and the liquid component of the dispersion is vaporized. Thus, as compared with the anticorrosion treatment method as described in 2) above, the Zn powder is more uniformly dispersed and maintained in the formed flux powder layer.

According to the production methods as described in 4) to 6) above, similar to the cases of the anticorrosion treatment methods as described in 1) to 3) above, pit corrosion resistance of the heat exchange tube in the produced heat exchanger is enhanced.

According to the heat exchanger production method as described in 6) above, the dispersion of the flux powder and the Zn powder in the binder is applied, and the liquid component of the dispersion is vaporized. Thus, as compared with the production method as described in 5) above, the Zn powder is more uniformly dispersed and maintained in the formed flux powder layer.

DESCRIPTION OF THE PREFERRED EMBODIMENTS

Embodiments of the present invention will next be described with reference to the drawings. In the embodiments, a method of the present invention is applied to a condenser for a car air conditioner.

Figure 1:
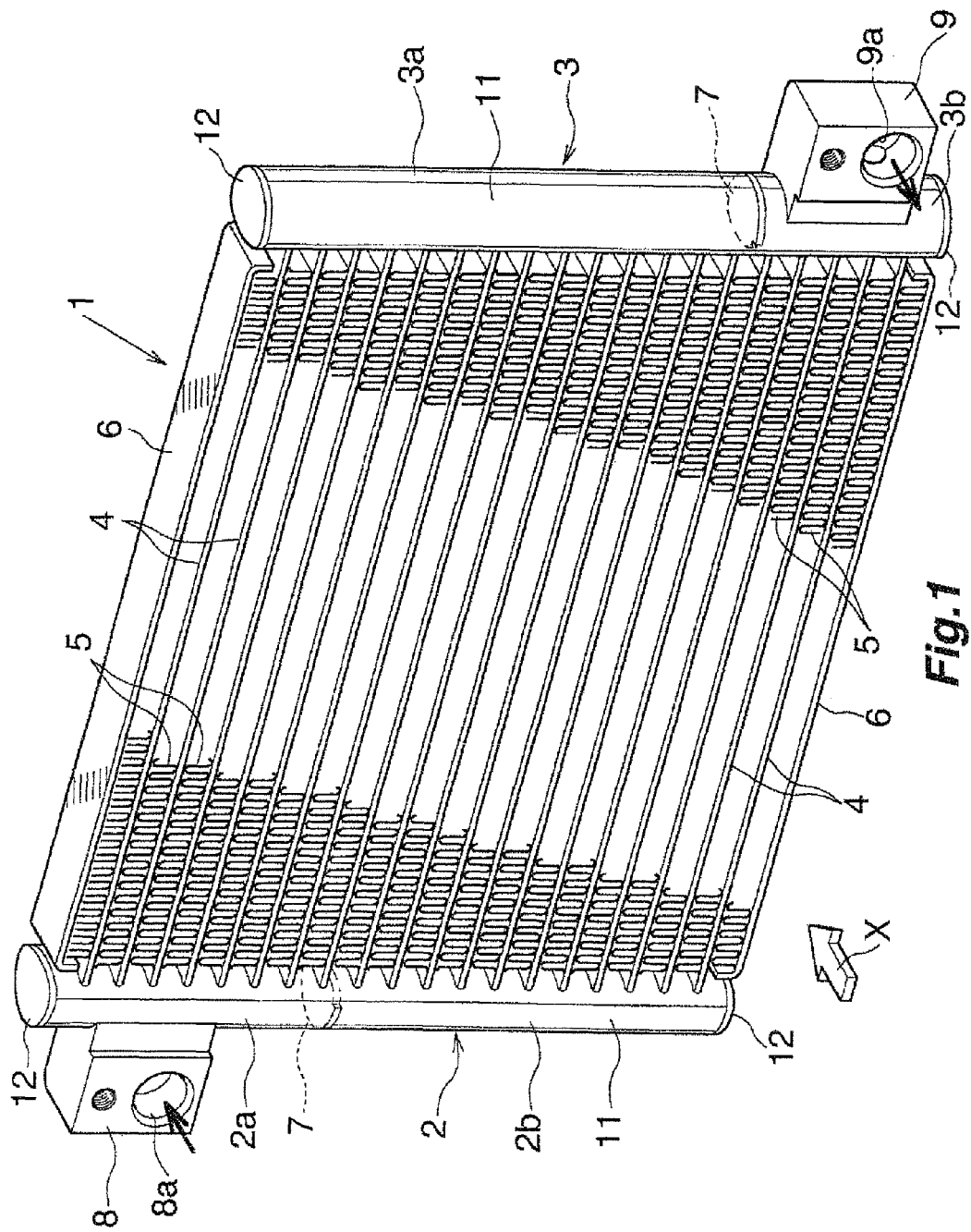
FIG. 1 is a perspective view showing the overall structure of a condenser for a car air conditioner produced through the method of the present invention.
Figure 2:
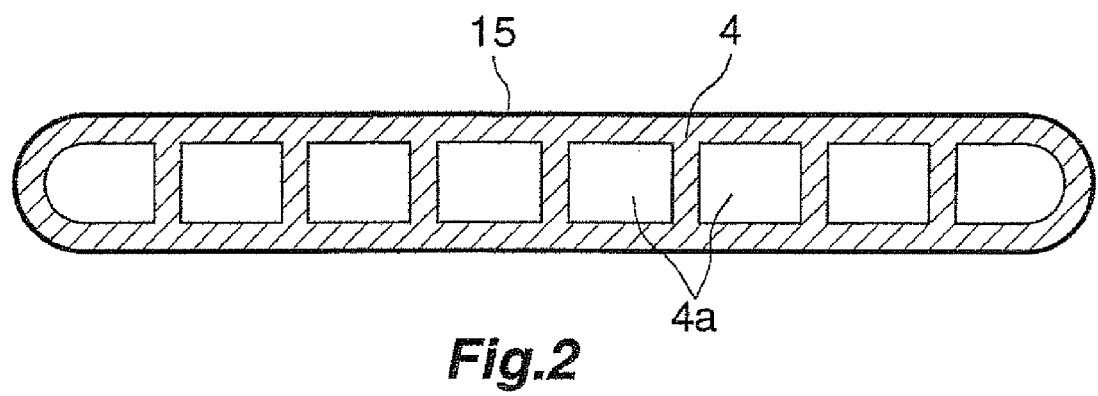
FIG. 2 is a transverse cross sectional a view showing a heat exchange tube having an outer surface on which flux powder and Zn powder are deposited, the tube produced in the method of producing the condenser shown in FIG. 1.
Figure 3:
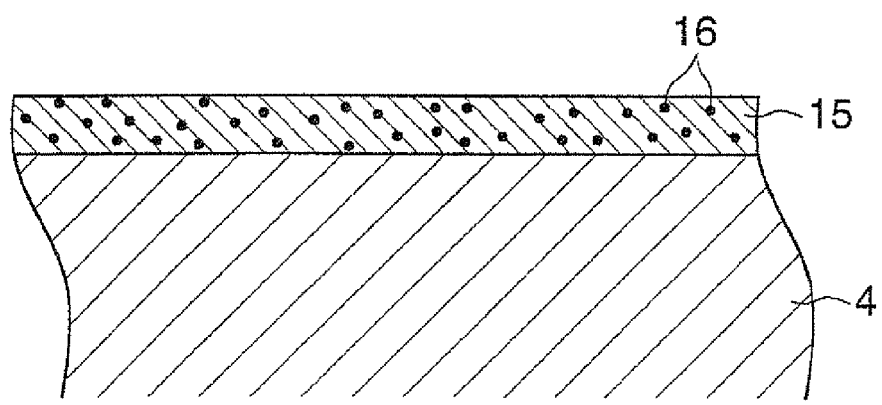
FIG. 3 is a partially enlarged view of FIG. 2.

FIG. 1 shows the entire structure of a condenser for a car air conditioner manufactured by the method of the present invention. FIG. 2 shows a heat exchange tube with flux powder and Zn powder applied to the outer surface thereof in the method of manufacturing the condenser of FIG. 1. FIG. 3 shows a portion of the heat exchange tube on an enlarged scale.

In the following description, the upper, lower, left-hand, and right-hand sides of FIG. 1 will be referred to as "upper," "lower," "left," and "right," respectively.

As shown in FIG. 1, a condenser 1 for a car air conditioner includes a pair of header tanks 2 and 3 formed of aluminum, a plurality of flat heat exchange tubes 4 formed of aluminum extrusion, corrugated fins 5 formed of aluminum, and side plates 6 formed of aluminum. The header tanks 2 and 3 are disposed such that their longitudinal direction coincides with a vertical direction and they are spaced apart from each other in a left-right direction. The heat exchange tubes 4 are disposed between the two header tanks 2 and 3 such that their longitudinal direction coincides with the left-right direction, their width direction coincides with an air-passing direction, and they are spaced apart from each other in the vertical direction. Opposite end portions of the heat exchange tubes 4 are brazed to the corresponding header tanks 2 and 3. Each of the fins 5 is disposed between adjacent heat exchange tubes 4, on the upper side of the upper-end heat exchange tube 4, or on the lower side of the lower-end heat exchange tube 4. The fins 5 are brazed to the corresponding heat exchange tubes 4. The side plates 6 are disposed on the upper side of the upper-end fin 5 and on the lower side of the lower-end fin 5, and are brazed to these fins 5. Air flows in a direction indicated by an arrow X in FIG. 1. Each exchange tube 4 has a plurality of refrigerant channels 4a (see FIG. 2) arranged in the width direction thereof.

The left header tank 2 is divided into upper and lower header sections 2a and 2b by a partition member 7 at a position above the center in the height direction. The right header tank 3 is divided into upper and lower header sections 3a and 3b by a partition member 7 at a position below the center in the height direction. A fluid inlet (not shown) is formed in the upper header section 2a of the left header tank 2. An inlet member 8 which is formed of aluminum and which has an inflow passage 8a communicating with the fluid inlet is brazed to the upper header section 2a of the left header tank 2. A fluid outlet (not shown) is formed in the lower header section 3b of the right header tank 3. An outlet member 9 which is formed of aluminum and which has an outflow passage 9a communicating with the fluid outlet is brazed to the lower header section 3b of the right header tank 3.

Each of the header tanks 2 and 3 is composed of a tank main body 11 and closure members 12. The tank main body 11 is an aluminum pipe having a brazing material layer on at least the outer surface thereof. For example, the tank main body 11 is a tubular member formed from an aluminum brazing sheet having a brazing material layer on each of opposite surfaces thereof. Specifically, the brazing sheet is formed into a tubular shape, and opposite side edge portions are partially overlapped with each other and brazed together. The tank main body 11 has a plurality of tube insertion holes elongated in the front-rear direction. The closure members 12 are formed of aluminum and which are brazed to opposite ends of the tank main body 11 so as to close openings at the opposite ends of the tank main body 11. The details of the header tank main body 11 are not shown. The header tank main body 11 may be an aluminum extruded tube with a brazing material sprayed onto the outer circumferential surface thereof.

The condenser 1 is manufactured by the following method.

First, there are prepared the heat exchange tubes 4, the fins 5, the side plates 6, the partition members 7, a pair of tubular header tank main body members formed of aluminum and having a brazing material layer on at least the outer surface thereof, the closer members 12, the inlet member 8, and the outlet member 9. Each of the header tank main body members has a plurality of tube insertion holes formed therein.

The heat exchange tube 4 is formed of an alloy composed of Mn 0.2 to 0.3 mass %, Cu 0.05 mass % or less, and Fe 0.2 mass % or less, the balance being Al, and unavoidable impurities and has a tube wall thickness of 200 µm or less. In some cases, the wall thickness of the heat exchange tube 4 is not generally the same and varies locally. A wall thickness of 200 µm or less means that the thickness of the thickest portion of the tube wall is 200 µm or less. The fins 5 are formed from a brazing sheet composed of an aluminum core and a cladding which is made of an aluminum braze and covers both surfaces of the core.

Separately, a dispersion is formed by dispersing a flux powder and a Zn powder in a binder, the Zn powder having a mean particle size of 3 to 5 µm and a maximum particle size less than 10 µm. The flux powder employed in the embodiment is a fluorine-containing, non-corrosive flux mainly containing a mixture of $KAlF_4$ and $KAlF_5$. An example of the binder is a solution of an acrylic resin dissolved in 3-methoxy-3-methyl-1-butanol. As a diluent, 3-methoxy-3-methyl-1-butanol is added to the dispersion, so as to regulate the viscosity of the binder.

Subsequently, the dispersion is applied onto the outer surface of the heat exchange tube 4, and a liquid component of the dispersion is vaporized, to thereby deposit the Zn powder and the flux powder on the outer surface of the heat exchange tube, such that the Zn powder deposition amount is adjusted to 1 to 3 $g/m^2$, the flux powder deposition amount is adjusted to 15 $g/m^2$ or less, and the ratio of the flux powder deposition amount to the Zn powder deposition amount (flux powder deposition amount/Zn powder deposition amount) is adjusted to 1 or more. The Zn powder and the flux powder are deposited on the outer surface of the heat exchange tube 4 through a deposition method. In one mode of the method, the dispersion is applied onto the outer surface of the heat exchange tube 4 through spraying and, subsequently, the liquid component of the dispersion is vaporized, to thereby deposit the Zn powder and the flux powder on the outer surface of the heat exchange tube 4. In another mode of the method, the dispersion is applied onto the outer surface of the heat exchange tube 4 through roller coating after the outer surface has been heated in advance and, subsequently, the liquid component of the dispersion is vaporized, to thereby deposit the Zn powder and the flux powder on the outer surface of the heat exchange tube 4.

As shown in FIGS. 2 and 3, when the Zn powder and the flux powder have been deposited on the outer surface of the heat exchange tube 4, a flux powder layer 15 containing the Zn powder 16 is formed on the outer surface of the heat exchange tube 4. In the flux powder layer 15, the Zn powder 16 is uniformly dispersed and maintained in the layer.

Subsequently, a pair of header tank main body preforms each having tube insertion holes are disposed such that they are spaced apart from each other. Each header tank main body preform is closed with a closure member 12 at each end thereof. A partition member 7 is disposed in each header tank main body preform, to thereby provide a header tank preform. The heat exchange tubes 4 and fins 5 are alternately disposed, and each end of the heat exchange tube 4 is inserted into a corresponding tube insertion hole of the header tank preform. The side plates 6 are disposed on the upper side of the upper-end fin 5 and on the lower side of the lower-end fin 5. Furthermore, the inlet member 8 and the outlet member 9 are attached to the corresponding header tank main body preforms.

Then, the heat exchange tubes 4, the fins 5, the side plates 6, the inlet member 8, and the outlet member 9 are temporarily fixed to the header tank preform composed of the header tank main body preform, the closure members 12, and the partition member 7, to thereby provide a temporarily fixed assembly.

The temporarily fixed assembly is placed in a brazing furnace and heated to a predetermined temperature. If required, parts other than the heat exchange tubes 4 are coated in advance with a flux through a known technique such as brush coating. During heating at preliminary and temporary fixation, the Zn powder 16 melts at the melting point of Zn. The thus-molten Zn is dispersed and maintained in the flux powder layer 15, similar to the Zn powder before melting.

As the temperature is further elevated from the temporary fixation temperature to the brazing temperature, the flux powder forming the flux powder layer 15 melts, whereby the fins 5 are brazed to the heat exchange tubes 4 and the side plates 6 by the mediation of the molten flux and the cladding material of the fins 5. Also, by the mediation of the brazing material of the header tank main body preform, the heat exchange tubes 4 are brazed to the header tank main body preform, and the header tank main body preform is brazed to the closure members 12 and the partition members 7. Simultaneously, the molten flux and the molten Zn deposited on the outer surface of each heat exchange tube 4 flow and spread, whereby Zn diffuses in the outer surface portion of the heat exchange tube 4, and the Zn diffusion layer is formed. Thus, the condenser 1 is manufactured.

EXAMPLES

The present invention will next be described in detail by way of the Examples and Comparative Example.

Example 1

An aluminum extruded heat exchange tube was formed from an alloy composed of Mn 0.25 mass %, the balance being Al, and unavoidable impurities, and having a Cu content of 0 mass % and a Fe content of 0.2 mass % or less, Cu and Fe being unavoidable impurities. The heat exchange tube had a transverse cross section shown in FIG. 2 and a width of 12 mm, a length of 650 mm, and a maximum wall thickness of 200 μm. Separately, corrugated fins were formed from a brazing sheet having a thickness of 70 μm and made of an aluminum core composed of Si 0.45 mass %, Mn 1.5 mass %, and Zn 1.5 mass %, the balance being Al, and unavoidable impurities, and a cladding formed of an aluminum braze which is formed of Si 8.7 mass %, the balance being Al, and unavoidable impurities and which covers both surfaces of the core.

There were provided a fluorine-containing, non-corrosive flux powder (containing ≥90 mass % of a mixture of $KAlF_4$ and $KAlF_5$ ($KAlF_5$ content: 10 to 40 mass %)), a Zn powder having a mean particle size of 3 to 5 μm and a maximum particle size less than 10 μm (5 mass % of the total weight of the Zn powder was zinc oxide), a binder (a solution of an acrylic resin dissolved in 3-methoxy-3-methyl-1-butanol), and a diluent (3-methoxy-3-methyl-1-butanol). The Zn powder and the non-corrosive flux powder were dispersed in the binder and the diluent, to thereby prepare a dispersion. The dispersion was found to have compositional proportions by weight; Zn powder:non-corrosive flux powder:binder:diluent of 15 parts by weight:45 parts by weight:40 parts by weight:27 parts by weight.

TABLE 1

| Prospected Zn powder deposition amount g/m² | Measurements | |
|---|---|---|
| | Zn powder amount g/m² | Flux powder amount g/m² |
| 1 | 0.77 | 3.76 |
| 2 | 1.69 | 7.64 |
| 3 | 2.14 | 8.66 |

Subsequently, the dispersion was sprayed onto the outer surface of the heat exchange tube, and the tube was dried in a drying apparatus, to thereby vaporize the liquid component of the dispersion. As a result, the Zn powder and the flux powder were deposited on the outer surface of the heat exchange tube, such that the Zn powder deposition amount was adjusted to 1 to 3 g/m², the flux powder deposition amount was adjusted to 15 g/m² or less, and the ratio of the flux powder deposition amount to the Zn powder deposition amount (flux powder deposition amount/Zn powder deposition amount) was adjusted to 1 or more. In the above procedure, the dispersion was sprayed onto the outer surface of the heat exchange tube, so as to adjust the Zn powder deposition amount to 1 g/m², 2 g/m², and 3 g/m². However, the actually measured Zn powder deposition amounts were as described in Table 1. Table 1 also shows the actually measured flux powder deposition amounts.

Then, a plurality of the produced heat exchange tubes and a plurality of rows of corrugated fins were alternately stacked to form a stacked body. The stacked body was placed in a furnace with a nitrogen atmosphere, and the heat exchange tubes and the corrugated fins were heated. The heat exchange tubes and the corrugated fins were maintained at substantial temperatures of 580 to 600° C. for 3 minutes, whereby the heat exchange tubes were brazed to the corrugated fins.

In the thus-produced brazed body, a Zn diffusion layer was formed in the outer surface portion of each of the heat exchange tubes. The Zn concentration at the outermost level was 0.78 to 1.13 mass %, and the thickness of the Zn diffusion layer was 70 to 85 μm.

Figure 4:
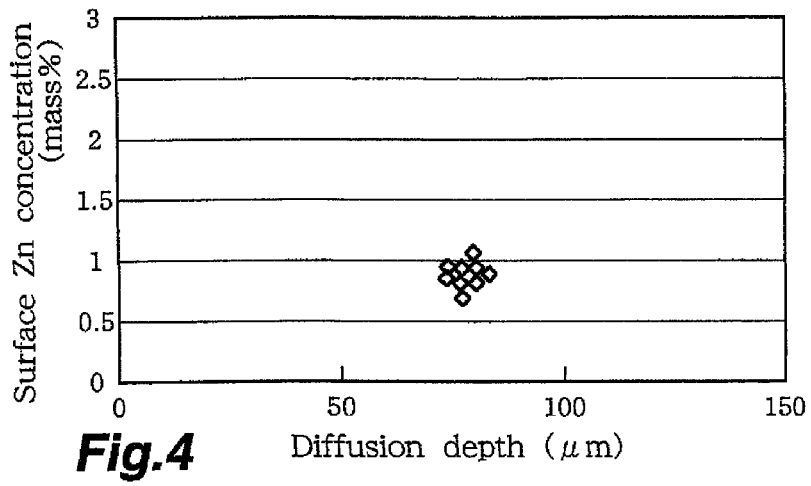
FIG. 4 is a graph showing the evaluation results of a brazed body of the heat exchange tubes and corrugated fins produced through the method of Example 1.

In the same manner, nine brazed bodies were produced through depositing the Zn powder and the flux powder, so as to attain a Zn powder deposition amount of 2 g/m². FIG. 4 shows the relationship between the outermost Zn concentration and the diffusion profile in the Zn diffusion layer formed in the outer surface portion of each heat exchange tube.

Example 2

The same heat exchange tubes, corrugated fins, non-corrosive flux powder, Zn powder, binder, and diluent as employed in Example 1 were provided. Then, the Zn powder and the non-corrosive flux powder were dispersed in the binder and the diluent, to thereby prepare a dispersion. The dispersion was found to have compositional proportions by weight; Zn powder:non-corrosive flux powder:binder:diluent of 6.7 parts by weight:40.0 parts by weight:35.6 parts by weight:17.8 parts by weight.

Subsequently, each of the heat exchange tubes was heated to a substantial temperature of 40° C., and the dispersion was applied onto the outer surface of the heat exchange tube through roller coating. The tube was dried in a drying apparatus, to thereby vaporize the liquid component of the dispersion. As a result, the Zn powder and the flux powder were deposited on the outer surface of the heat exchange tube, such that the Zn powder deposition amount was adjusted to 1 to 3 g/m², the flux powder deposition amount was adjusted to 15 g/m² or less, and the ratio of the flux powder deposition amount to the Zn powder deposition amount (flux powder deposition amount/Zn powder deposition amount) was adjusted to 1 or more.

In the above procedure, the dispersion was sprayed onto the outer surface of the heat exchange tube, so as to adjust the Zn powder deposition amount to 1 g/m², 2 g/m², and 3 g/m². However, the actually measured Zn powder deposition amounts were as described in Table 2. Table 2 also shows the actually measured flux powder deposition amounts.

TABLE 2

| Prospected Zn powder deposition amount g/m² | Measurements | |
|---|---|---|
| | Zn powder amount g/m² | Flux powder amount g/m² |
| 1 | 0.91 | 4.41 |
| 2 | 1.79 | 8.83 |
| 3 | 2.23 | 10.70 |

Then, a plurality of the produced heat exchange tubes and a plurality of rows of corrugated fins were alternately stacked to form a stacked body. The stacked body was placed in a furnace with a nitrogen atmosphere, and the heat exchange tubes and the corrugated fins were heated. The heat exchange tubes and the corrugated fins were maintained at substantial temperatures of 580 to 600° C. for 3 minutes, whereby the heat exchange tubes were brazed to the corrugated fins.

In the thus-produced brazed body, a Zn diffusion layer was formed in the outer surface portion of each of the heat exchange tubes. The Zn concentration at the outermost level was 0.63 to 0.76 mass %, and the thickness of the Zn diffusion layer was 65 to 80 µm.

Figure 5:
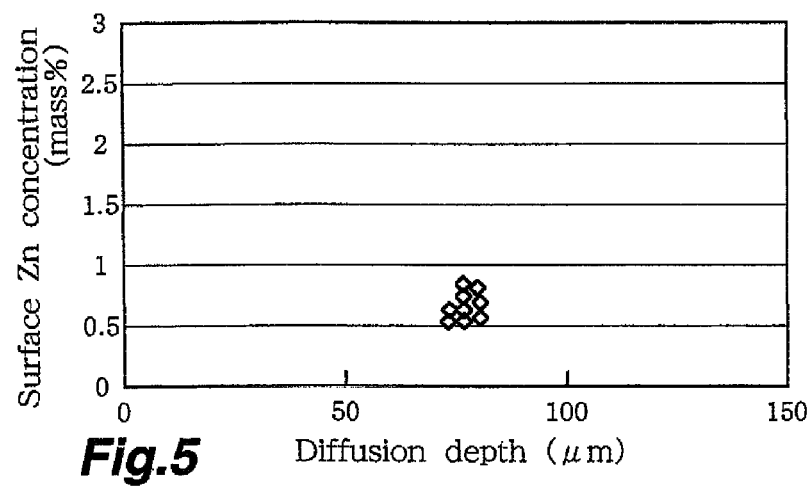
FIG. 5 is a graph showing the evaluation results of a brazed body of the heat exchange tubes and corrugated fins produced through the method of Example 2.

In the same manner, nine brazed bodies were produced through depositing the Zn powder and the flux powder, so as to attain a Zn powder deposition amount of 2 g/m$^2$. FIG. 5 shows the relationship between the outermost Zn concentration and the diffusion profile in the Zn diffusion layer formed in the outer surface portion of each heat exchange tube.

Comparative Example

An aluminum extruded heat exchange tube was formed from an alloy composed of Cu 0.45 mass % and Zn 5.0 mass %, the balance being Al, and unavoidable impurities. The heat exchange tube had a transverse cross section shown in FIG. 2 and a width of 12 mm, a length of 650 mm, and a maximum wall thickness of 200 µm.

Subsequently, a Zn spray coating film was formed on the outer surface of the heat exchange tube through spray coating.

Then, a plurality of the produced heat exchange tubes and a plurality of rows of corrugated fins having the same shape as employed in the Examples were alternately stacked to form a stacked body. The stacked body was placed in a furnace with a nitrogen atmosphere, and the heat exchange tubes and the corrugated fins were heated. The heat exchange tubes and the corrugated fins were maintained at substantial temperatures of 580 to 600° C. for 3 minutes, whereby the heat exchange tubes were brazed to the corrugated fins.

In the thus-produced brazed body, a Zn diffusion layer was formed in the outer surface portion of each of the heat exchange tubes. The Zn concentration at the outermost level was 1 to 2.5 mass %, and the thickness of the Zn diffusion layer was 85 to 105 µm.

Figure 6:
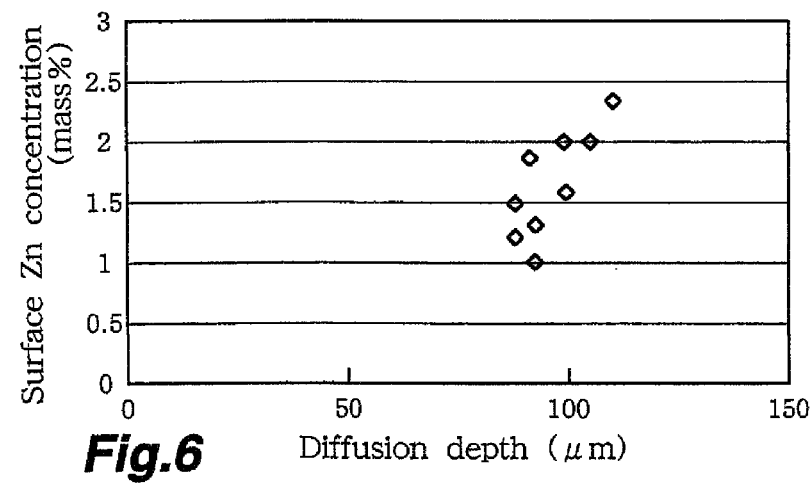
FIG. 6 is a graph showing the evaluation results of a brazed body of the heat exchange tubes and corrugated fins produced through the method of Comparative Example.

In the same manner, nine brazed bodies were produced. FIG. 6 shows the relationship between the outermost Zn concentration and the diffusion profile in the Zn diffusion layer formed in the outer surface portion of each heat exchange tube.

As is clear from FIGS. 4 to 6, in Examples 1 and 2, variation in the outermost Zn concentrations of the produced brazed bodies and variation in the diffusion depths of Zn diffusion layers formed in the outer surface portions of the heat exchange tubes are smaller than those observed in Comparative Example.

Evaluation Test

Each of the brazed bodies, produced in Examples 1 and 2 and Comparative Example, of heat exchange tubes and corrugated fins were subjected to an SWAAT 960 hr test, whereby the corrosion state thereof was checked. As a result, the maximum corrosion depth of the outer surface a heat exchange tube obtained through the test of the brazed bodies of Example 1 was found to be 45 µm, and the maximum corrosion depth of the outer surface a heat exchange tube obtained through the test of the brazed bodies of Example 2 was found to be 53 µm. In contrast, the maximum corrosion depth of the outer surface a heat exchange tube obtained through the test of the brazed bodies of Comparative Example was found to be 70 µm.

What is claimed is:

1. A method for performing an anticorrosion treatment on an outer surface of an aluminum extruded heat exchange tube, the method comprising:
   providing an aluminum extruded heat exchange tube which is formed of an alloy comprising Mn 0.2 to 0.3 mass %, Cu 0.05 mass % or less, and Fe 0.2 mass % or less, the balance being Al, and unavoidable impurities, and which has a wall thickness of 200 µm or less;
   applying a dispersion of a flux powder and a Zn powder, the Zn powder having a mean particle size of 3 to 5 µm and a maximum particle size less than 10 µm, in a binder onto the outer surface of the heat exchange tube, and vaporizing a liquid component of the dispersion, to thereby deposit the Zn powder and the flux powder on the outer surface of the heat exchange tube, such that a Zn powder deposition amount is adjusted to 1 to 3 g/m$^2$, a flux powder deposition amount is adjusted to 15 g/m$^2$ or less, and a ratio of the flux powder deposition amount to the Zn powder deposition amount (flux powder deposition amount/Zn powder deposition amount) is adjusted to 1 or more; and
   elevating the temperature of the heat exchange tube to thereby melt the Zn powder, and then diffusing Zn to an outer surface portion of the heat exchange tube, to thereby form a Zn diffusion layer in the outer surface portion of the heat exchange tube.

2. A method for anticorrosion treatment on an outer surface of an aluminum extruded heat exchange tube according to claim 1, wherein the dispersion is applied onto the outer surface of the heat exchange tube through spraying and, subsequently, the liquid component of the dispersion is vaporized, to thereby deposit the Zn powder and the flux powder on the outer surface of the heat exchange tube.

3. A method for anticorrosion treatment on an outer surface of an aluminum extruded heat exchange tube according to claim 1, wherein the dispersion is applied onto the outer surface of the heat exchange tube through roller coating after the outer surface has been heated in advance and, subsequently, the liquid component of the dispersion is vaporized, to thereby deposit the Zn powder and the flux powder on the outer surface of the heat exchange tube.

4. A method for producing a heat exchanger, comprising:
   providing an aluminum extruded heat exchange tube which is formed of an alloy comprising Mn 0.2 to 0.3 mass %, Cu 0.05 mass % or less, and Fe 0.2 mass % or less, the balance being Al, and unavoidable impurities, and which has a wall thickness of 200 µm or less, and fins formed from a brazing sheet composed of an aluminum core and a cladding made of an aluminum braze and covering both surfaces of the core;
   applying a dispersion of a flux powder and a Zn powder, the Zn powder having a mean particle size of 3 to 5 µm and a maximum particle size less than 10 µm, in a binder onto the outer surface of the heat exchange tube, and vaporizing a liquid component of the dispersion, to thereby deposit the Zn powder and the flux powder on the outer surface of the heat exchange tube, such that a Zn powder deposition amount is adjusted to 1 to 3 g/m$^2$, a flux powder deposition amount is adjusted to 15 g/m$^2$ or less, and a ratio of the flux powder deposition amount to the Zn powder deposition amount (flux powder deposition amount/Zn powder deposition amount) is adjusted to 1 or more; and combining and heating the heat exchange tube and the fins, to thereby braze the heat exchange tube to the fins by use of the flux powder deposited on the outer surface of the heat exchange tube and the braze of the fins, and melting the Zn powder deposited on the outer surface of the heat exchange tube, and then diffusing Zn to an outer surface portion of the heat exchange tube, to thereby form a Zn diffusion layer in the outer surface portion of the heat exchange tube.

5. A heat exchanger production method according to claim 4, wherein the dispersion is applied onto the outer surface of the heat exchange tube through spraying and, subsequently, the liquid component of the dispersion is vaporized, to thereby deposit the Zn powder and the flux powder on the outer surface of the heat exchange tube.

6. A heat exchanger production method according to claim 4, wherein the dispersion is applied onto the outer surface of the heat exchange tube through roller coating after the outer surface has been heated in advance and, subsequently, the liquid component of the dispersion is vaporized, to thereby deposit the Zn powder and the flux powder on the outer surface of the heat exchange tube.

* * * * *